United States Patent
Mishra

(10) Patent No.: US 10,133,797 B1
(45) Date of Patent: Nov. 20, 2018

(54) DISTRIBUTED HETEROGENEOUS SYSTEM FOR DATA WAREHOUSE MANAGEMENT

(71) Applicant: Amazon Technologies, Inc., Reno, NV (US)

(72) Inventor: Maheshdatta Mishra, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 761 days.

(21) Appl. No.: 13/968,934

(22) Filed: Aug. 16, 2013

(51) Int. Cl.
*G06F 17/30* (2006.01)

(52) U.S. Cl.
CPC .. *G06F 17/30563* (2013.01); *G06F 17/30587* (2013.01)

(58) Field of Classification Search
CPC .... G06F 17/30589; G06F 17/30557–17/30563
USPC ................................. 707/802, 805
See application file for complete search history.

(56) References Cited

U.S. PATENT DOCUMENTS

| | | | | |
|---|---|---|---|---|
| 5,559,984 A * | 9/1996 | Nakano | ................ | G06F 12/122 707/999.002 |
| 6,880,313 B1 * | 4/2005 | Gessford | ................ | B65B 9/026 53/415 |
| 7,987,152 B1 * | 7/2011 | Gadir | ................ | G06F 17/30566 707/602 |
| 8,024,369 B2 * | 9/2011 | Pellegrini | ............. | G06F 9/5038 707/758 |
| 8,161,077 B2 | 4/2012 | Zha et al. | | |
| 8,209,703 B2 | 6/2012 | Yee et al. | | |
| 8,335,758 B2 | 12/2012 | Chang et al. | | |
| 8,380,657 B2 | 2/2013 | Shaik et al. | | |
| 8,417,805 B2 | 4/2013 | Zeine et al. | | |
| 2002/0194248 A1 * | 12/2002 | Wood | .................... | G06F 9/5038 718/102 |
| 2003/0172139 A1 * | 9/2003 | Srinivasan | .............. | H04L 67/02 709/221 |
| 2009/0089078 A1 * | 4/2009 | Bursey | ................. | G06Q 10/101 705/300 |
| 2010/0179887 A1 * | 7/2010 | Cacheria, III | ..... | G06Q 10/1057 705/26.1 |

(Continued)

*Primary Examiner* — James Trujillo
*Assistant Examiner* — Fariborz Khoshnoodi
(74) *Attorney, Agent, or Firm* — Robert C. Kowert; Meyertons, Hood, Kivlin, Kowert & Goetzel, P.C.

(57) ABSTRACT

Methods, systems, and computer-readable storage media for implementing data warehouse management are disclosed. A data warehouse management system includes a job request scheduler configured to generate a workflow for data warehouse operations. The data warehouse management system includes a request manager configured to retrieve job requests for the data warehouse operations from the job request scheduler. The data warehouse management system includes a priority queue service configured to place each of the job requests into a respective priority queue based on their priorities. The data warehouse management system includes a worker service configured to retrieve the job requests from the priority queues in a priority order and to cause execution of the data warehouse operations. The data warehouse management system includes a data warehouse service including one or more database clusters configured to store data relating to the data warehouse operations.

20 Claims, 16 Drawing Sheets

(56) References Cited

U.S. PATENT DOCUMENTS

2011/0119407 A1\* 5/2011 Shah ................... G06F 3/0611
710/6

\* cited by examiner

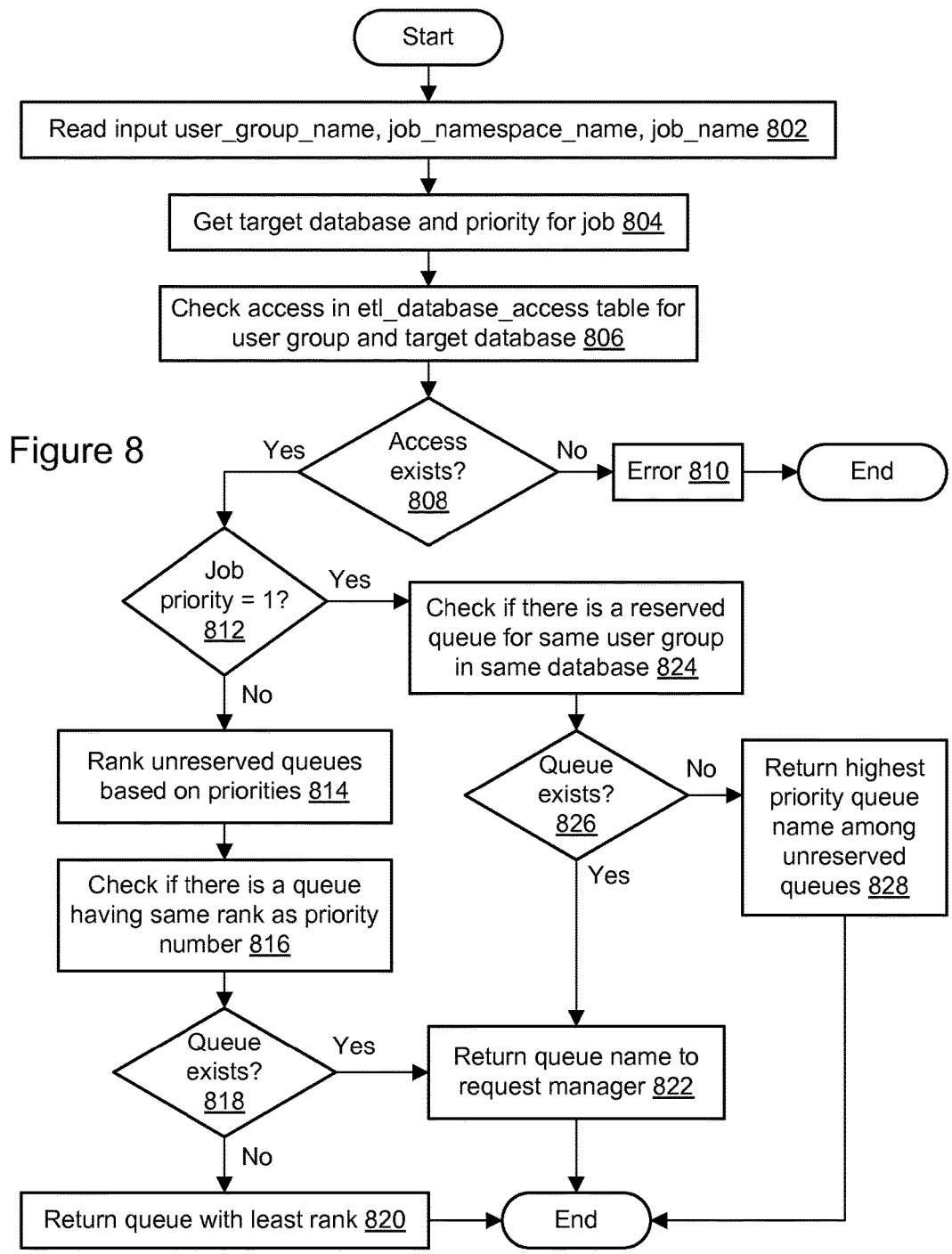

DISTRIBUTED HETEROGENEOUS SYSTEM FOR DATA WAREHOUSE MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

As the technological capacity for organizations to create, track, and retain information continues to grow, a variety of different technologies for managing and storing the rising tide of information have been developed. Distributed database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. For many distributed database systems, managing and maintaining data across distributed resources also involves the reliability of storage systems. System transactions that are performed across multiple resources of distributed systems are one area where maintaining reliability can impede efficient performance. As a result, new technologies more and more seek to reduce both the complexity and storage requirements of maintaining data while simultaneously improving the efficiency of data storage and data management.

BRIEF DESCRIPTION OF THE DRAWINGS

FIG. 8 is a flowchart illustrating a method performed by a priority queue service for data warehouse management, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for providing data warehouse management are described. Using the systems and methods described herein, a single data warehouse management system may support heterogeneous underlying data warehouses. The data warehouses may have different technical characteristics, and the data warehouses may be network-based or located locally (e.g., on the client premises). The data warehouse management system may provide a single infrastructure for using different ETL (extract, transform, and load) tools to move data into or out of the underlying data warehouses. In this manner, management of heterogeneous data warehouses and/or heterogeneous ETL tools may be simplified.

Figure 1A:
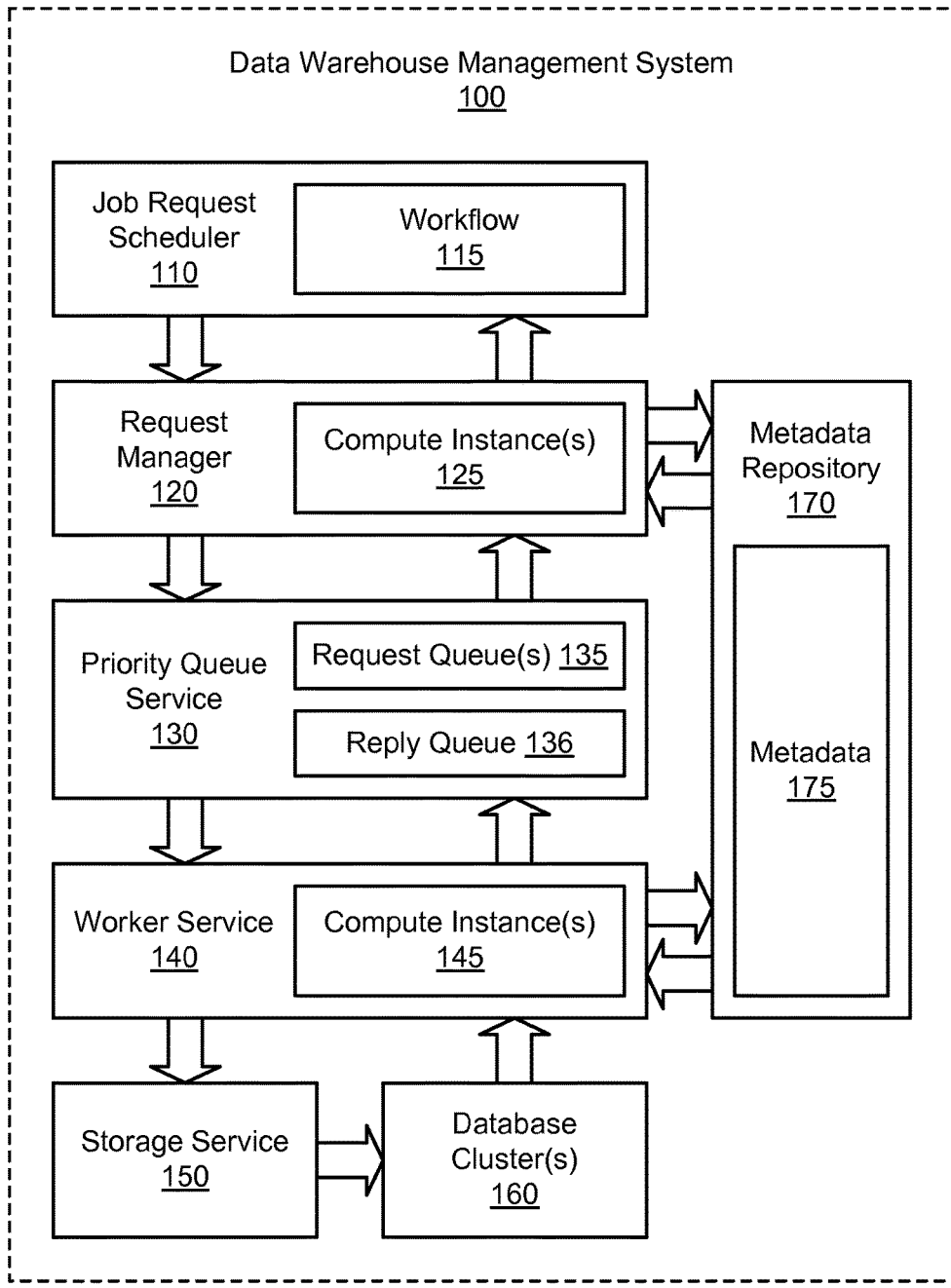
FIG. 1A illustrates an example system environment for data warehouse management, according to some embodiments.

FIG. 1A illustrates an example system environment for data warehouse management, according to some embodiments. The example system environment may include a data warehouse management system 100. The data warehouse management system 100 may include a plurality of components or functionalities for managing one or more data warehouses. As used herein, the term "data warehouse" includes any suitable data repository, and typically a repository that stores data used for reporting purposes. In various embodiments, the data warehouse management system 100 may include a job request scheduler 110, a request manager 120, a priority queue service 130, a worker service 140, a storage service 150, one or more database clusters 160, and/or a metadata repository 170.

Figure 10:
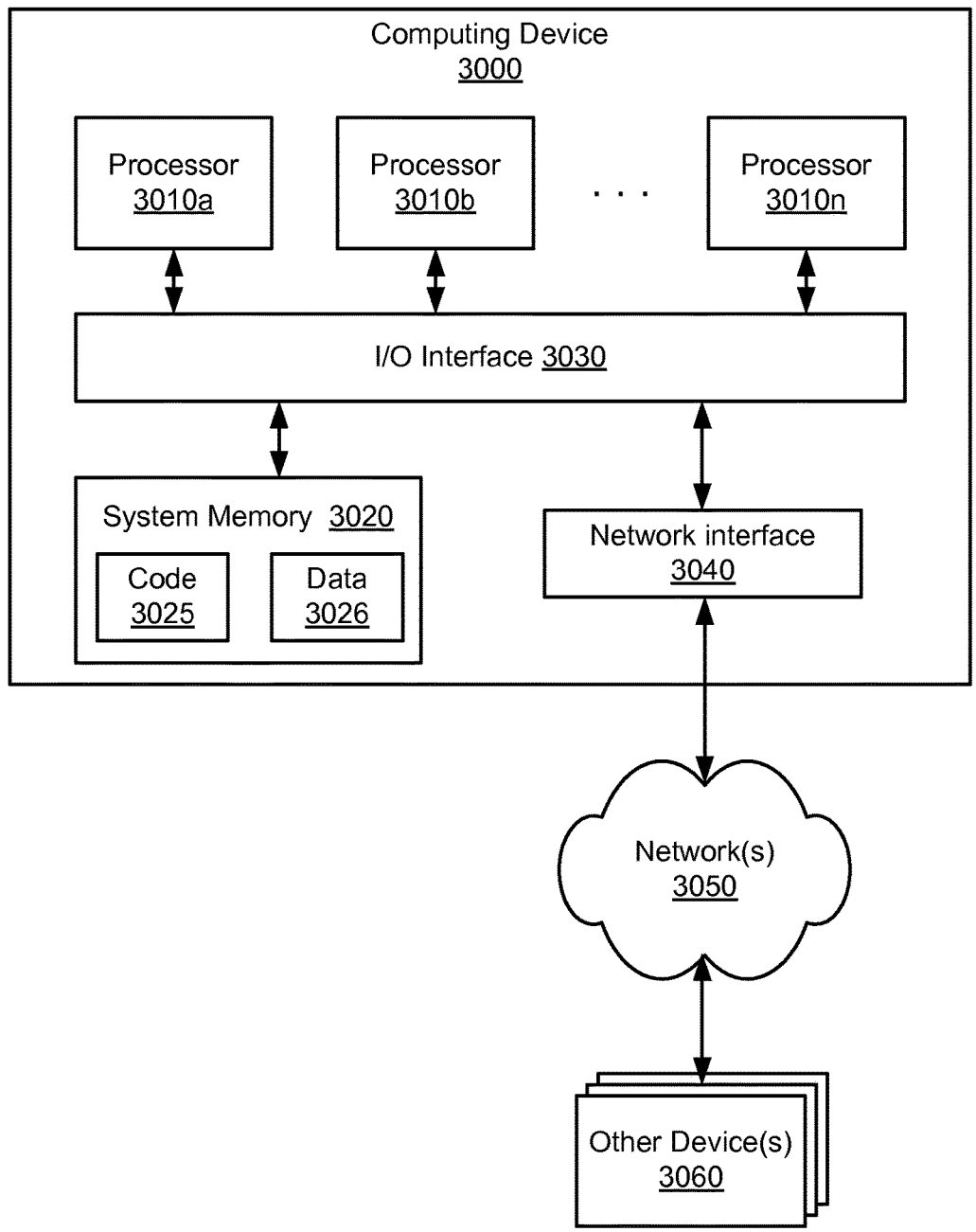
FIG. 10 illustrates an example of a computing device that may be used in some embodiments.

The data warehouse management system 100 may comprise one or more computing devices, any of which may be implemented by the example computing device 3000 illustrated in FIG. 10. In various embodiments, the functionality of the different services, components, and/or modules of the data warehouse management system 100 (e.g., job request scheduler 110, request manager 120, priority queue service 130, a worker service 140, storage service 150, database cluster(s) 160, and metadata repository 170) may be provided by the same computing device or by different computing devices. If any of the various components are implemented using different computing devices, then the respective computing devices may be communicatively coupled, e.g., via a network. Each of the illustrated components may represent any combination of software and hardware usable to perform their respective functions, as discussed as follows.

In some embodiments, the data warehouse management system 100 may enable the use of one or more ETL tools for extraction of data from an external data source, transformation of data, and/or loading of data into one or more data warehouses. In some embodiments, the data warehouse management system 100 may also enable the generation of reports relating to data in one or more data warehouses. In some embodiments, the data warehouse management system 100 may integrate both network-based data warehouses and native (i.e., on-premise or locally hosted) data warehouses. In some embodiments, the data warehouse management system 100 may enable the use of heterogeneous ETL tools that are commercially available from various vendors. In some embodiments, the data warehouse management system 100 may provide priority management, dependency management, and/or resource management functionalities for the data warehouses and the ETL tools.

Job Request Scheduler

In various embodiments, a job request scheduler 110 including a workflow 115 may provide one or more services allowing users to schedule and manage data-driven workflows. In some embodiments, the job request scheduler 110 may provide clients with access to functionality for creating, configuring, and executing defined workflows that manipulate source data in defined manners, such as under the control of a configurable workflow service that is available to multiple remote clients. The workflow 115 may comprise a non-cyclical, directed graph of workflow nodes. Each individual workflow node may be configured to perform a specific task. For example, the workflow 115 may define one or more tasks for extracting, transforming, and/or loading data for a data warehouse; individual workflow nodes may be configured to perform specific tasks such as loading a source file or calling a data transformation procedure. As a further example, loading tasks configured as workflow nodes may consume data from a storage source such as Amazon Simple Storage Service (S3) and may load staging tables for a data warehouse from Amazon S3; after the staging tables have been loaded, additional in-database processing may be driven by additional workflow nodes to populate star schemas, aggregations, and presentation schemas in one or more database clusters 160.

In at least some embodiments, a remote client may interact with a configurable workflow service over one or more public networks in order to create and configure a defined workflow that is provided by the configurable workflow service for use by the client. Such a defined workflow may, for example, include multiple interconnected workflow components (e.g., one or more workflow nodes) that are each configured to perform one or more specified types of data manipulation operations on a specified type of input data. After a client has configured such a defined workflow, the configurable workflow service may further execute the defined workflow at one or more times and in one or more manners, such as in some situations by provisioning one or more compute instances provided by the configurable workflow service to each implement at least one of the workflow components for the defined workflow, and by retrieving defined types of source data and providing it to workflow components in defined manners.

As noted above, a defined workflow may include multiple workflow components, which may be of multiple types in at least some embodiments, including one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. Accordingly, the workflow 115 may include dependencies between workflow nodes such that a dependent workflow node may not be scheduled for execution until another workflow node has completed execution. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to data obtained from an indicated data source, and each component may include information such as a storage location for the data and optionally additional access information related to the storage location (e.g., login information associated with the client, a particular search or other information to use to identify data to be used, such as metadata and/or data contents, etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types, Amazon Relational Database Service (RDS) that provides relational database functionality, Amazon SimpleDB that provides database functionality to store key-value pairs, Amazon DynamoDB service that provides NoSQL database functionality, Amazon Elastic Block Store (EBS) that provides access to raw block storage devices (e.g., mounting a virtual local block storage device on a target computer system), etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database, a hash table, a file system, an object store, etc., optionally implemented in a distributed manner. A non-exclusive list of examples of data groups that may be obtained from a data source includes a file (e.g., a web server log), a database row or other record, a stored data object, a streamed group of data, etc.

Thus, in some situations and embodiments, a particular defined workflow may obtain and use data from multiple data sources, with some or all of the data sources optionally being external to the configurable workflow service. In addition, the configurable workflow service may optionally predefine one or more types of data source workflow components, such as to correspond to a particular internal storage mechanism of the configurable workflow service, to correspond to one or more particular online storage services (e.g., online storage services that are integrated with or otherwise affiliated with the configurable workflow service, or that instead are unaffiliated with the configurable workflow service), etc. Similarly, a client may optionally define one or more data source workflow components, such as to correspond to a client-specific storage location, to an online storage service without a predefined data source workflow component, etc.

The job request scheduler 110 may be used to configure one or more tasks for extraction, transformation, and/or loading of data for one or more data warehouses. Accordingly, each data manipulation workflow component that is defined for a workflow may correspond to one or more defined data transformations or other manipulations on data that is input to the data manipulation workflow component. In addition, the output from a data manipulation workflow component may be provided to a data destination workflow component (and thus to be provided to a client), or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service). Defined data manipulations may be of various forms, including a defined type of calculation on one or more groups of input data, aggregation of multiple groups of input data in one or more manners, selection of a subset of one or more groups of input data, moving data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc. Thus, in some situations and embodiments, a particular defined workflow may perform multiple data manipulation operations via multiple defined data manipulation workflow components, using predefined and/or client-defined data manipulation workflow components.

The destinations for tasks defined by the job request scheduler 110 may include one or more database clusters 160 associated with one or more data warehouses. Accordingly, each data destination workflow component that is defined for a workflow may correspond to output data provided from the defined workflow to one or more storage locations and in one or more manners. The types of storage locations used by data destination workflow components (and corresponding information stored for such data destination workflow components) may be similar to or the same as for data source workflow components in at least some embodiments, including storage locations that are internal to and/or external from the configurable workflow service. In addition, in at least some embodiments and situations, particular data destination workflow components may include operations to prepare and/or provide output data in a particular manner, such as by generating particular types of reports, by sending output data via one or more types of defined electronic communications, etc. Thus, in some situations and embodiments, a particular defined workflow may provide multiple types of output data in multiple manners via multiple defined data destination workflow components, using predefined and/or client-defined data destination workflow components.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows. In at least some such embodiments, the configurable workflow service may represent the defined workflow as a graph that logically represents the workflow, with various graph nodes corresponding to particular workflow components.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple compute instances that each implement at least one workflow component for the defined workflow. In particular, in at least some embodiments, some or all of the compute instances are provisioned by the configurable workflow service to implement particular workflow components (e.g., to load corresponding software and/or data on those compute instances), such as to each execute a workload worker process corresponding to each such implemented workflow component. The compute instances may have various forms in at least some embodiments, including a separate physical computer system, a separate virtual machine (e.g., one of multiple virtual machines hosted on a physical computer system), a group of multiple physical computer systems that are operating in a distributed manner, etc. Some or all such compute instances used for a defined workflow may in some embodiments be selected from a plurality of compute instances provided by the configurable workflow service for use by clients. In addition, some or all such compute instances may be provided by or otherwise controlled by the client and/or may be provided by one or more online execution services, whether instead of or in addition to compute instances provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc. In addition, when a particular defined workflow is to be implemented multiple times, the configurable workflow service may in some embodiments maintain the provisioning and availability of some or all compute instances for the defined workflow between two or more such times (e.g., in accordance with instructions from the client, based on an automated determination by the configurable workflow service, etc.). In other embodiments, the configurable workflow service may release some or all such compute instances to be available after an implementation and provide the same types of provisioning of computing nodes (optionally different compute instances) for a next implementation.

A defined workflow may further have additional types of associated information in at least some embodiments. For example, a client may specify information that indicates when to implement a defined workflow, e.g., based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as criteria associated with particular workflow components or instead with the defined workflow as a whole. For example, a particular workflow component may have defined pre-condition criteria to be evaluated to determine when to execute the workflow component. Additionally, a particular workflow component may have defined post-condition criteria to be evaluated to determine when to complete execution and/or where to provide the output data (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

Metadata Repository

In one embodiment, a metadata repository 170 may store metadata 175 relating to the ETL jobs, users, data warehouses, and queues associated with the data warehouse management system 100. The metadata repository 170 may receive updates for the metadata 175 at appropriate points in time, e.g., during the queueing and execution of the ETL tasks. In one embodiment, the metadata repository 170 may record the end-to-end status of any ETL task. At any given time, an ETL task may have a status such as "created," "enqueued," "running," and finally "success" or "failure." In one embodiment, the metadata repository 170 stores information used by the request manager 120 and worker service 140 to execute jobs, such as the process priority, priority queue, database, user groups, user access, and statuses. In one embodiment, information relating to workflow dependencies is maintained by the job request scheduler 110 and not by the metadata repository 170 so that the job request scheduler 110 can perform dependency management in scheduling tasks.

In one embodiment, the metadata repository 170 may be implemented using any suitable data repository system, such as a relational database management system. In one embodiment, the relational database management system may include Amazon Relational Database Service (RDS). Accordingly, the metadata 175 may be maintained in the metadata repository 170 using one or more relational database tables. For example, the metadata 175 may include at least one table to record status information for the request manager 120 and at least one table to record status information for the worker service 140.

Request Manager

In one embodiment, a request manager service 120 may poll for activity requests from the job request scheduler 110. Requests may contain the executable location and any associated metadata such as activity name, requested priority, security tokens, and publishing details. The request manager 120 may pass messages to a worker service 140 using one or more queues. The request manager 120 may also define the priority for a job. When job commands are issued from the job request scheduler 110 to the request manager 120, the request manager 120 may decode all dynamic parameters (e.g., date and file path) and create the actual command line that the worker service 140 can comprehend. The request manager 120 may then ask for the priority of the ETL job, e.g., as defined in the metadata repository 170. The request manager 120 may then pass the command line to the appropriate request queue 135 as a message and then waits for the reply from the worker service 140 as written to the metadata repository 170. A listener process in the request manager 120 may continuously poll the reply queue 136 and update the metadata 175 accordingly.

The request manager 120 may be implemented using one or more compute instances 125. In various embodiments, the compute instances 125 may take various forms, including a separate physical computer system, a separate virtual machine (e.g., one of multiple virtual machines hosted on a physical computer system), a group of multiple physical computer systems that are operating in a distributed manner, etc. The compute instances 125 may be provided by or otherwise controlled by the client (e.g., on the premises of the client) and/or may be provided by one or more online execution services. For example, at least some of the compute instances 125 may be provisioned using an online execution service such as the Amazon Elastic Compute Cloud ("EC2") program execution service; compute instances provisioned in this manner may be referred to as EC2 instances.

Priority Queue Service

In one embodiment, a priority queue service 130 may maintain a plurality of queues for activity requests. Activity requests may be placed in an appropriate request queue by the request manager 120 and picked up by a worker service 140. In one embodiment, for each database cluster 160, the priority queue service 130 may maintain one or more request queues 135 and a reply queue 136. The request queue(s) 135 may carry messages from the request manager 120 to the worker service 140, and the reply queue may carry messages from the worker service 140 to the request manager 120. Each of the request queue(s) 135 may represent a different priority level for workflow tasks. In one embodiment, different tasks within a workflow (as represented by different ones of the workflow 115) may be assigned different priorities. In various embodiments, the queues may be implemented using Amazon Simple Queue Service (SQS) or any other suitable queue service.

In one embodiment, authentication of users is managed using LDAP (lightweight directory access protocol) user groups. To execute any job on the underlying database cluster(s) 160, the user group should have access to specific database. In order to get the job executed with a higher priority, the user group may reserve their priority queue. In one embodiment, one user group may have only one reserved queue in a particular database cluster 160. If there is no priority queue reserved for a user group in one of the database clusters 160, then the user group may be able to execute the query or ETL task on the database cluster 160 in an unreserved queue. Each database cluster 160 may have at least one unreserved queue.

In one embodiment, each job is defined under a namespace, and each namespace may have only one user group as its owner. The job priority may be defined at the process namespace level or at the process level. The namespace priority may be considered as the job priority only if there is no defined priority on the job. In one embodiment, the job priority may override the namespace priority.

Worker Service

In one embodiment, a worker service 140 may retrieve activity requests from the request queue(s) 135 and execute the requests based on their relative priority. The worker service 140 may report the progress of an executing job using the reply queue 136. The worker service 140 may also monitor the performance of database cluster(s) 160 and decide which of the database cluster(s) should handle the job associated with the activity request. In some embodiments, the worker service 140 may select a database cluster for a job based on any suitable factors, such as the current load on each cluster (e.g., in terms of CPU and I/O), the queue priority, the expected execution time using historical execution run times, the current queue wait time, etc. The worker service may write a log representing the output of a job to the storage service 150.

In one embodiment, the worker service 150 may include two major components: a work manager daemon and a worker. The work manager daemon may polls the request queue(s) 135 based on the priority order defined in the metadata repository 170. Accordingly, the work manager daemon may first scan the highest priority queue (e.g., priority 1), then the next highest priority queue (e.g., priority 2), and so on. If there is a job enqueued in the highest priority queue, then the first available worker host may pick up that job first; lower priority jobs may then wait until the next resource is available to them.

In one embodiment, a worker may be an extraction, transformation, or loading script that is executed, for example, to push data to the database cluster(s) 160. A worker may read a configuration file (e.g., in the storage service 150) and execute the job. In one embodiment, a worker may be implemented using a commercially available ETL engines which can be triggered using an appropriate interface. Accordingly, the worker fleet may be a heterogeneous fleet including, for example, both legacy systems located on client data centers and Amazon EC2 instances accessible to the client over a network.

The worker service 140 may be implemented using one or more compute instances 145. In various embodiments, the compute instances 145 may take various forms, including a separate physical computer system, a separate virtual machine (e.g., one of multiple virtual machines hosted on a physical computer system), a group of multiple physical computer systems that are operating in a distributed manner, etc. The compute instances 145 may be provided by or otherwise controlled by the client (e.g., on the premises of the client) and/or may be provided by one or more online execution services. For example, at least some of the compute instances 145 may be provisioned using an online execution service such as the Amazon Elastic Compute Cloud ("EC2") program execution service; compute instances provisioned in this manner may be referred to as EC2 instances.

Storage Service

In one embodiment, a storage service 150 may be used as a data source for data that is loaded into the database cluster(s) 160 for any suitable ETL tasks. In one embodiment, the storage service 150 may be used to store data that is produced from the database cluster(s) 160 as a result of any suitable ETL tasks. Any suitable storage service may be used. In one embodiment, Amazon Simple Storage Service (S3) may be used as the storage service 150.

Database Clusters

One or more database clusters 160 may implement one or more data warehouses. In various embodiments, the database cluster(s) 160 may execute queries or other suitable database management tasks that are defined for the workflow 115. After a query or other task executes on the database cluster(s), the worker service 140 may save the results of the execution, e.g., to files on the storage service 150. The worker service 140 may then place status information on the reply queue 136. The request manager 120 may process the entry on the reply queue 136, update the workflow metadata 175 in the metadata repository 170, and return information relating to the completion of the job back to the job request scheduler 110. The job request scheduler 110 may use the job completion information to schedule additional tasks using dependency management techniques. For example, the job request scheduler 110 may wait until the completion of a first job before scheduling the execution of a second job that is dependent on the first job.

In one embodiment, at least one of the data warehouses may provide a cost-effective, persistent, and massively parallel data warehousing solution. A distributed database system may, in some embodiments, implement a network-based service that makes it quick, easy, and cost-effective for clients (e.g., subscribers) to set up, operate, and scale a data warehouse in a network-based computing environment. The network-based service may manage time-consuming administration tasks, thereby allowing subscribers to focus on their own applications and businesses. In some embodiments, the data warehouse may be an enterprise-class database query and management system that is highly scalable and extensible. It may provide fast querying capabilities over structured data, may provide integration with various data loading and ETL (extract, transform, and load) tools, may provide client connections with best-in-class business intelligence (BI) reporting, data mining, and analytics tools, and may be optimized for very fast execution of complex analytic queries such as those including multi-table joins, sub-queries, and aggregation. In some embodiments, queries may be distributed and parallelized across multiple physical resources, and the data warehouse may be scaled up or down on an as needed basis. In some embodiments, subscribers may only pay for the resources they use. The data warehouse may work effectively with database schemas of various types and/or organizations, in different embodiments.

In one embodiment, at least one of the data warehouses may provide for the clustering of compute nodes that carry out the execution of queries (e.g., using a divide-and-conquer strategy). In some embodiments, a cluster may include one or more nodes, each including one or more disks, solid state devices, or other persistent storage devices on which data blocks are stored on behalf of clients. In some embodiments, the multiple database clusters 160 may include a central integrated database cluster along with one or more reporting clusters. The reporting clusters may be used for high availability data mining and regular reporting purposes. In one embodiment, the use of multiple clusters may be used to mitigate a concurrency limitation (e.g., a maximum number of connections) of a single cluster.

In one embodiment, the database clusters 160 may include multiple clusters that are arranged in a cluster group. A Tier 1 cluster group may contain the staging, integration, and aggregation schema layers. A Tier 2 cluster group may contain business-specific aggregations and presentation schemas. The Tier 2 cluster group may also contain sandbox databases in which customers will be permitted to create, load, and maintain ad-hoc tables to support rapid analysis and information delivery.

Figure 1B:
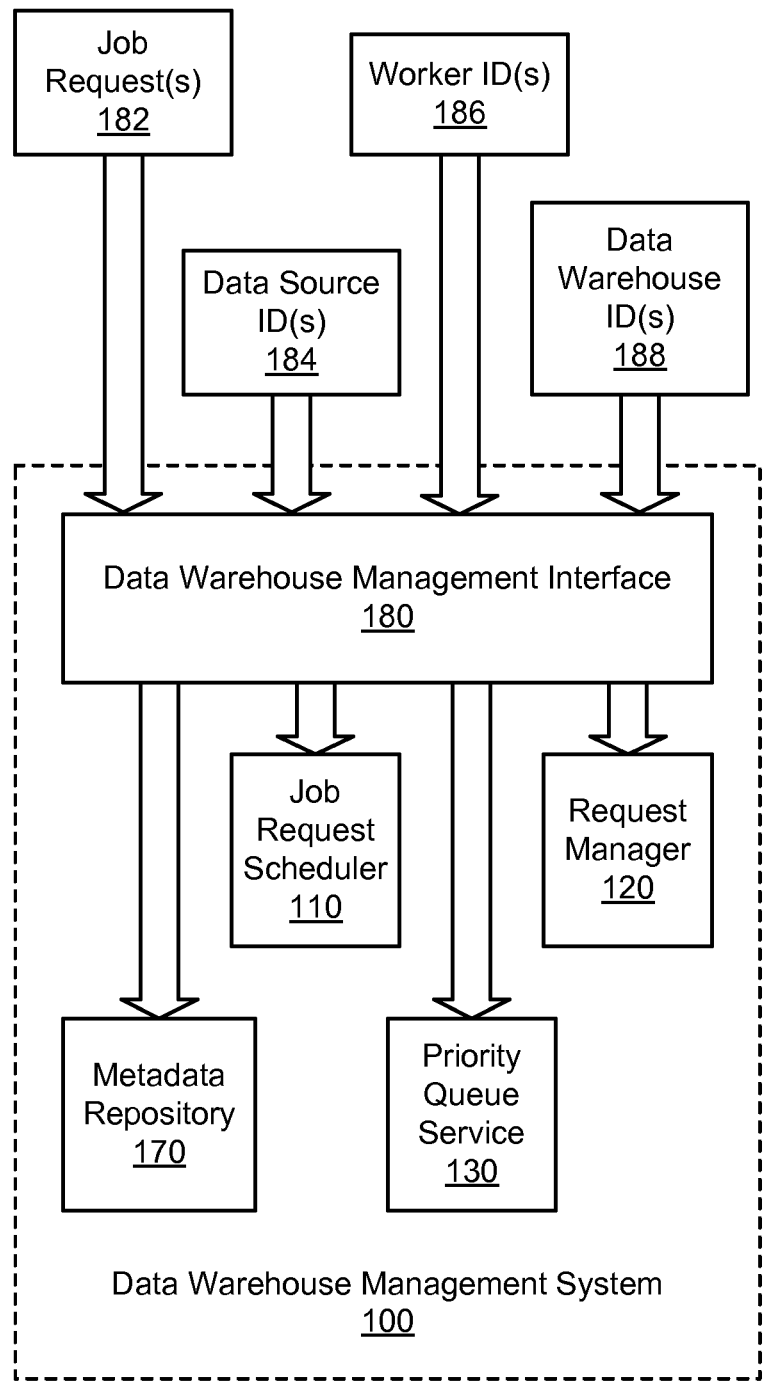
FIG. 1B illustrates further aspects of the example system environment for data warehouse management including a configuration interface, according to some embodiments.

FIG. 1B illustrates further aspects of the example system environment for data warehouse management including a configuration interface, according to some embodiments. In one embodiment, a suitable user interface for data warehouse management may permit a user to configure, create, and/or manage workflows for ETL (extract, transform, and load) tasks and/or other data warehouse management tasks. In one embodiment, the user interface for data warehouse management may also be used to generate reports. The user interface may integrate aspects of job request scheduling and other aspects of data warehouse management. For example, in addition to job request scheduling functions, the user interface for data warehouse management may include maintenance screens for adding attribution for activities (e.g., activity name and priority), screens to show the current status of request queues 135 and worker queues, screens for managing report publishing, access to activity logs, etc.

As shown in FIG. 1B, a data warehouse management interface 180 may include aspects of any suitable type of interface, including a user interface (e.g., a graphical user interface or command line interface) and/or an application programming interface (API). The data warehouse management interface 180 accept input defining a variety of types of data that are usable in configuring the workflow 115 and in configuring various additional services that may be used in queuing and executing jobs. Examples of types inputs are shown in FIG. 1B; however, it is contemplated that additional types of inputs may also be accepted. In one embodiment, the data warehouse management interface 180 may accept input defining one or more job requests 182. In one embodiment, the data warehouse management interface 180 may accept one or more data source IDs 184. The data source ID(s) 184 may define, for example, the storage service 150 and/or other suitable data sources for ETL operations. In one embodiment, the data warehouse management interface 180 may accept one or more worker IDs 186. The worker ID(s) 186 may define, for example, the worker service 140 and/or other suitable workers for ETL operations. In one embodiment, the data warehouse management interface 180 may accept one or more data warehouse IDs 188. The data warehouse ID(s) 188 may define, for example, the database cluster(s) 160 and/or other suitable data targets for ETL operations.

Based on the various types of data accepted by the data warehouse management interface 180, the workflow 115 may be configured by the job request scheduler 110, e.g., to define a job based on the various inputs. Additional services of the data warehouse management system 100 may also be configured accordingly. For example, metadata 175 such as the user group name in the metadata repository 170 may be configured according to the inputs. Additionally, the inputs may be used to instantiate, provision, and/or configure services such as the request manager 120 and/or priority queue service 130 for use in queuing and executing the job request(s) 182. Accordingly, the data warehouse management interface 180 may be able to communicate with various of the services and other components illustrated in FIGS. 1A and 1B using any appropriate interface, e.g., one or more APIs.

In one embodiment, the data warehouse management interface 180 may be network-based relative to a client who seeks to schedule job requests. In other words, the one or more computer systems hosting the data warehouse management interface 180 may be hosted on premises not operated by the client and may be accessible to the client only over a network. In another embodiment, the data warehouse management interface 180 may be operated by the client on one or more computer systems hosted by the client, e.g., on premises managed by the client.

Figure 1C:
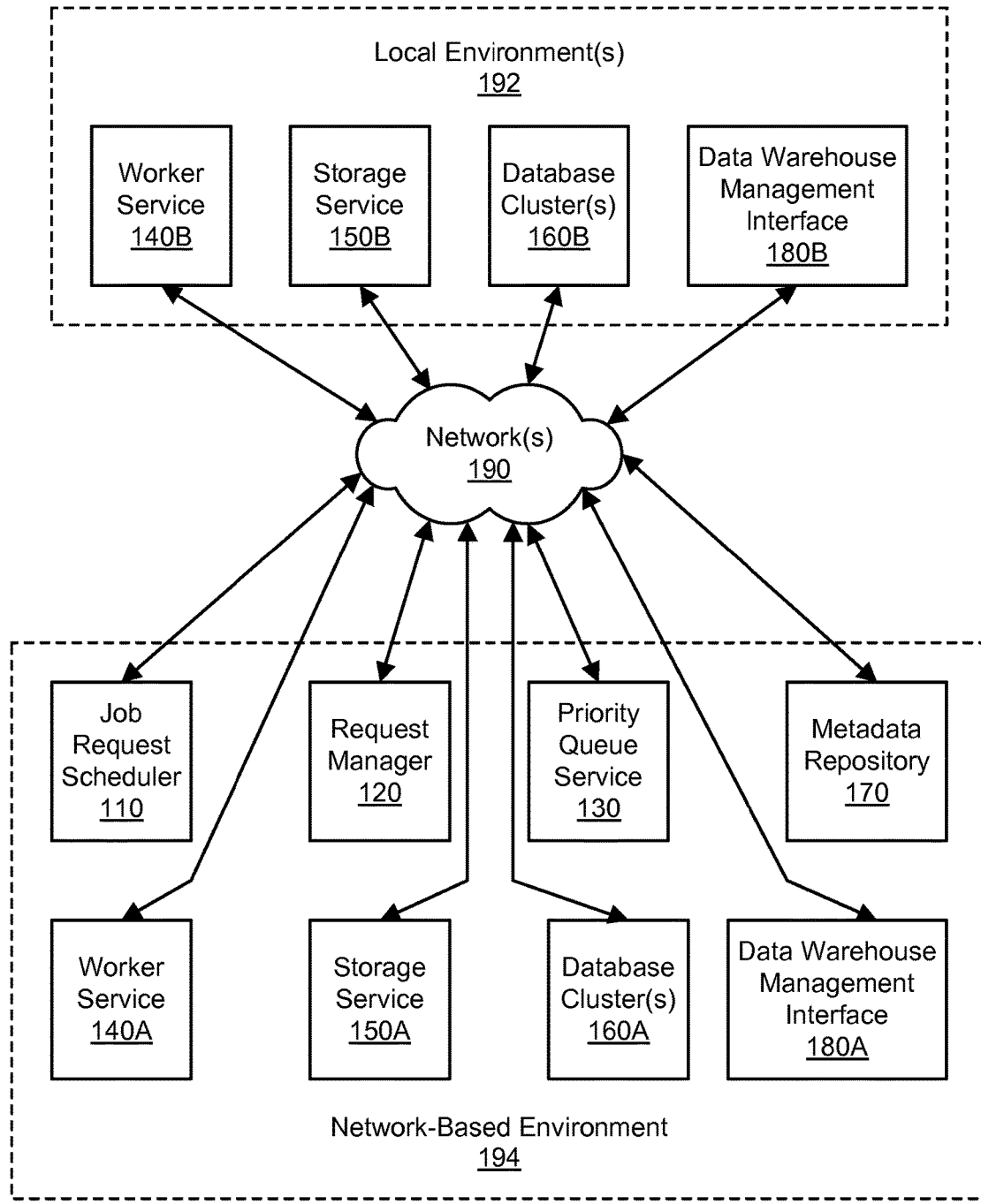
FIG. 1C illustrates further aspects of the example system environment for data warehouse management including a network configuration, according to some embodiments.

FIG. 1C illustrates further aspects of the example system environment for data warehouse management including a network configuration, according to some embodiments. In various embodiments, various ones of the services and other components illustrated in FIGS. 1A and 1B may be located in various geographical locations, either on premises managed by a client or off premises managed by a client and accessible to the client only over a network. FIG. 1C shows examples of both on-premises and off-premises services and components that may be used with the systems illustrated in FIGS. 1A and 1B. The components shown in FIG. 1C are shown for purposes of example; it is contemplated that any of the services or components shown in FIGS. 1A and 1B may be located on or off client premises, and it is contemplated that more instances or fewer instances of some of the components may be included in any configuration of the data warehouse management system 100.

In one embodiment, services and components such as a worker service 140B, a storage service 150B, one or more database clusters 160B of a data warehouse system, and a data warehouse management interface 180B may be located in (e.g., hosted on computer systems in) one or more local environments 192. The local environment(s) 192 may include one or more physical locations that are managed by one or more clients of the data warehouse management system 100. In one embodiment, services and components such as the job request scheduler 110, request manager 120, priority queue service 130, and metadata repository 170 may be hosted in a network-based environment 194 including one or more physical locations that are not managed by the client(s). The local environment(s) 192 and the network-based environment 194 may be coupled by one or more networks 190. In one embodiment, the network-based environment 194 may also include services and components such as a network-based worker service 140A, a network-based storage service 150A, a network-based data warehouse management interface 180A, and/or a network-based data warehouse system including one or more database clusters 160A. In various embodiments, any of the network-based services and components 140A, 150A, 160A, and 180A may be used in conjunction with their local counterparts (i.e., services and components 140B, 150B, 160B, and 180B) or instead of their local counterparts. In various embodiments, any of the local services and components may be used instead of their network-based counterparts. Using the systems and methods described herein for data warehouse management, heterogeneous services and components may be seamlessly used together in the systems shown in FIGS. 1A and 1B.

Figure 2A:
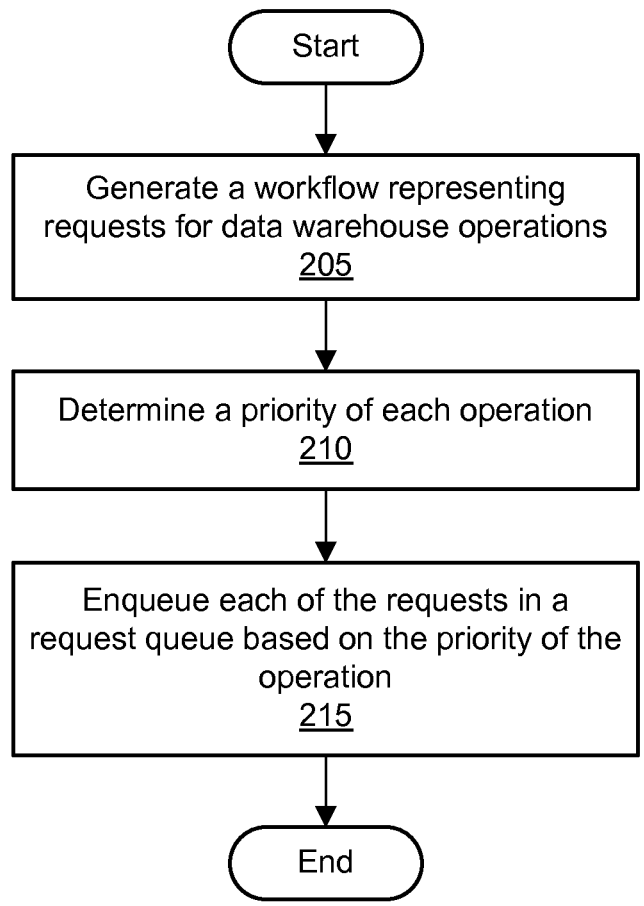
FIGS. 2A and 2B are flowcharts illustrating methods for data warehouse management based on priority management, according to some embodiments.
Figure 2B:
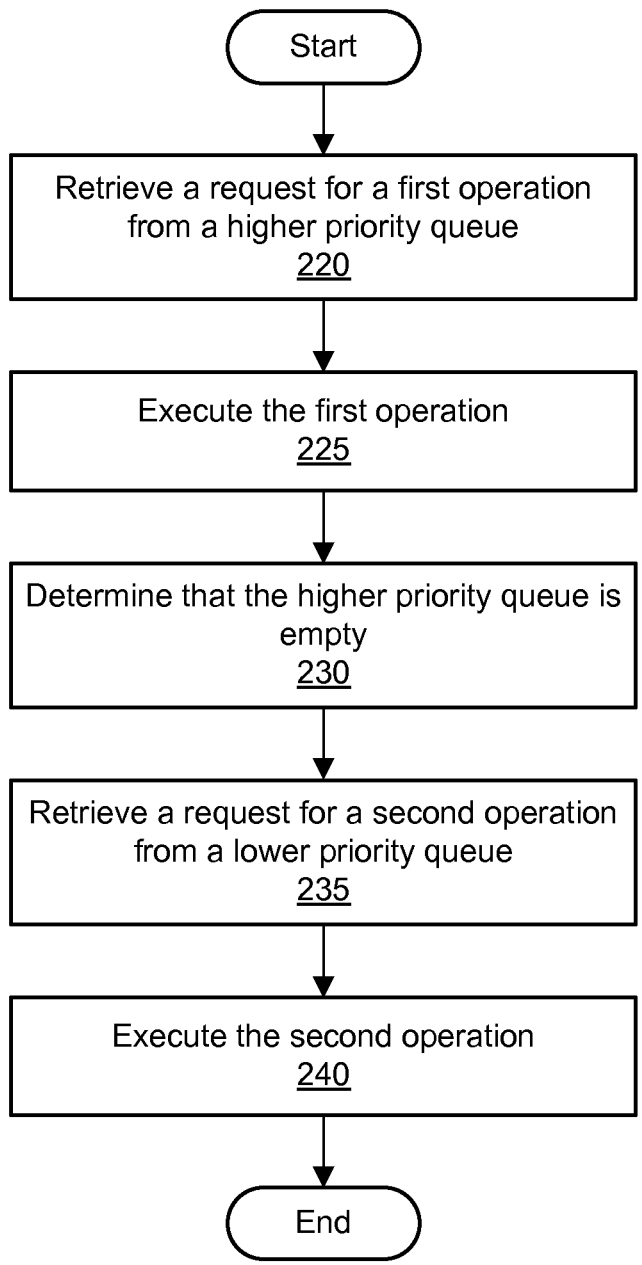

FIGS. 2A and 2B are flowcharts illustrating methods for data warehouse management based on priority management, according to some embodiments. As shown in 205, a workflow representing a plurality of requests for data warehouse operations may be generated. In one embodiment, the workflow may be generated using the job request scheduler 110. The data warehouse operations may include a first data warehouse operation and a second data warehouse operation. Either of the data warehouse operations may include an extraction of data from a data source, a transformation of the extracted data, and a loading of the transformed data into a data warehouse.

As shown in 210, a priority of each of the requests for data warehouse operations may be determined. In one embodiment, the priorities may be determined by referencing metadata stored in a metadata repository. Further aspects of the priority determination are discussed below with respect to FIG. 8.

As shown in 215, each of the requests for data warehouse operations may be enqueued. Each request may be enqueued in a particular request queue according to the priority of the request. For example, the request for the first data warehouse operation may be enqueued in a higher priority request queue, and the request for the second warehouse operation may be enqueued in the lower priority request queue.

In one embodiment, the operations shown in FIG. 2B may be performed after the operations shown in FIG. 2A. As shown in 220, the request for the first data warehouse operation may be retrieved from the higher priority request queue. As shown in 225, the first operation may be executed. In one embodiment, the request may be retrieved and executed by a worker service. The request for the first operation may be removed from the higher priority request queue after it is executed.

As shown in 230, it may be determined that the higher priority request queue is empty. As shown in 235, the request for the second data warehouse operation may be retrieved from the lower priority request queue. As shown in 240, the second operation may be executed. In one embodiment, the request may be retrieved and executed by a worker service. The request for the second operation may be removed from the lower priority request queue after it is executed.

Figure 3A:
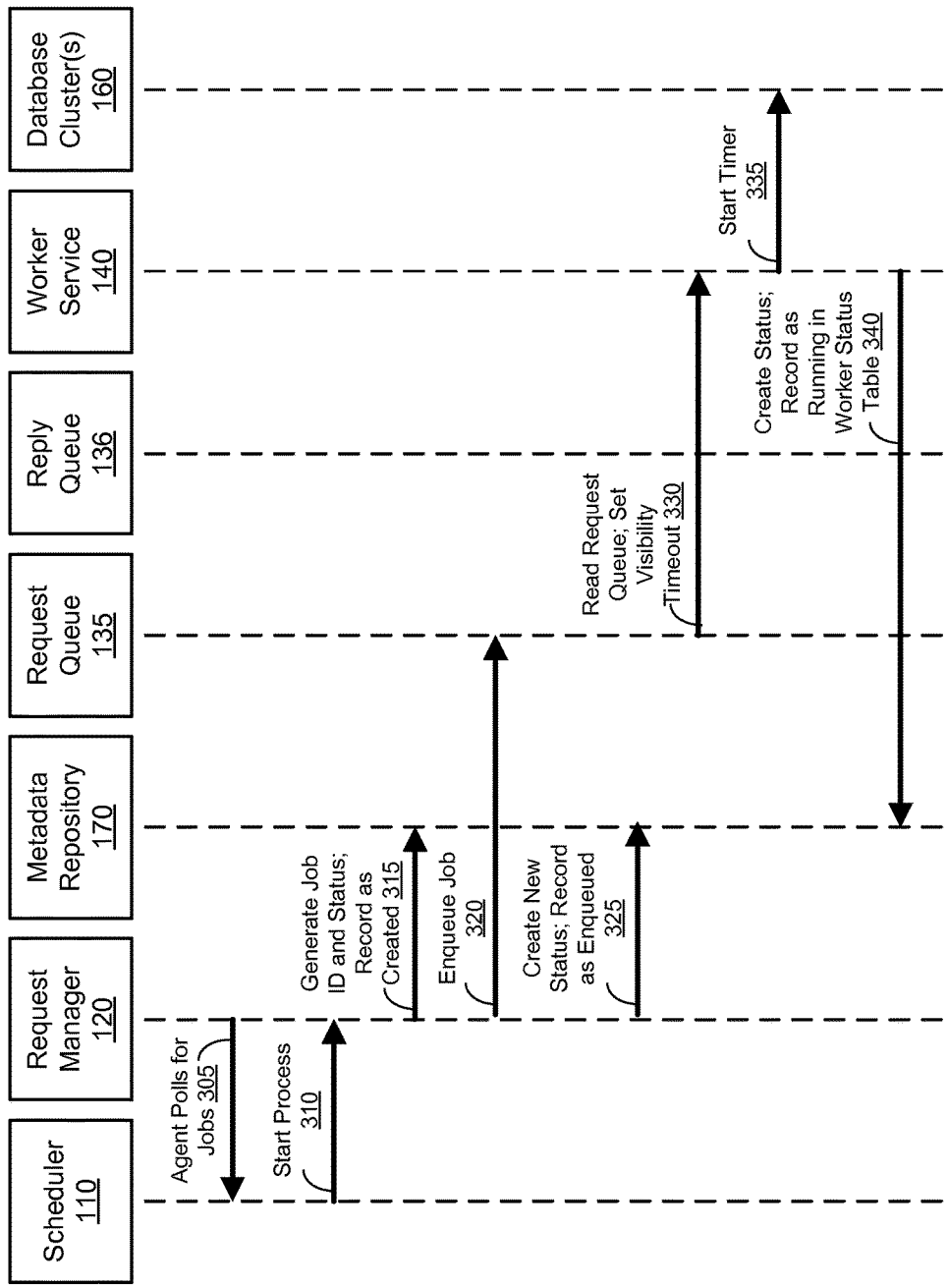
FIGS. 3A and 3B are process sequence diagrams for data warehouse management, according to some embodiments.
Figure 3B:
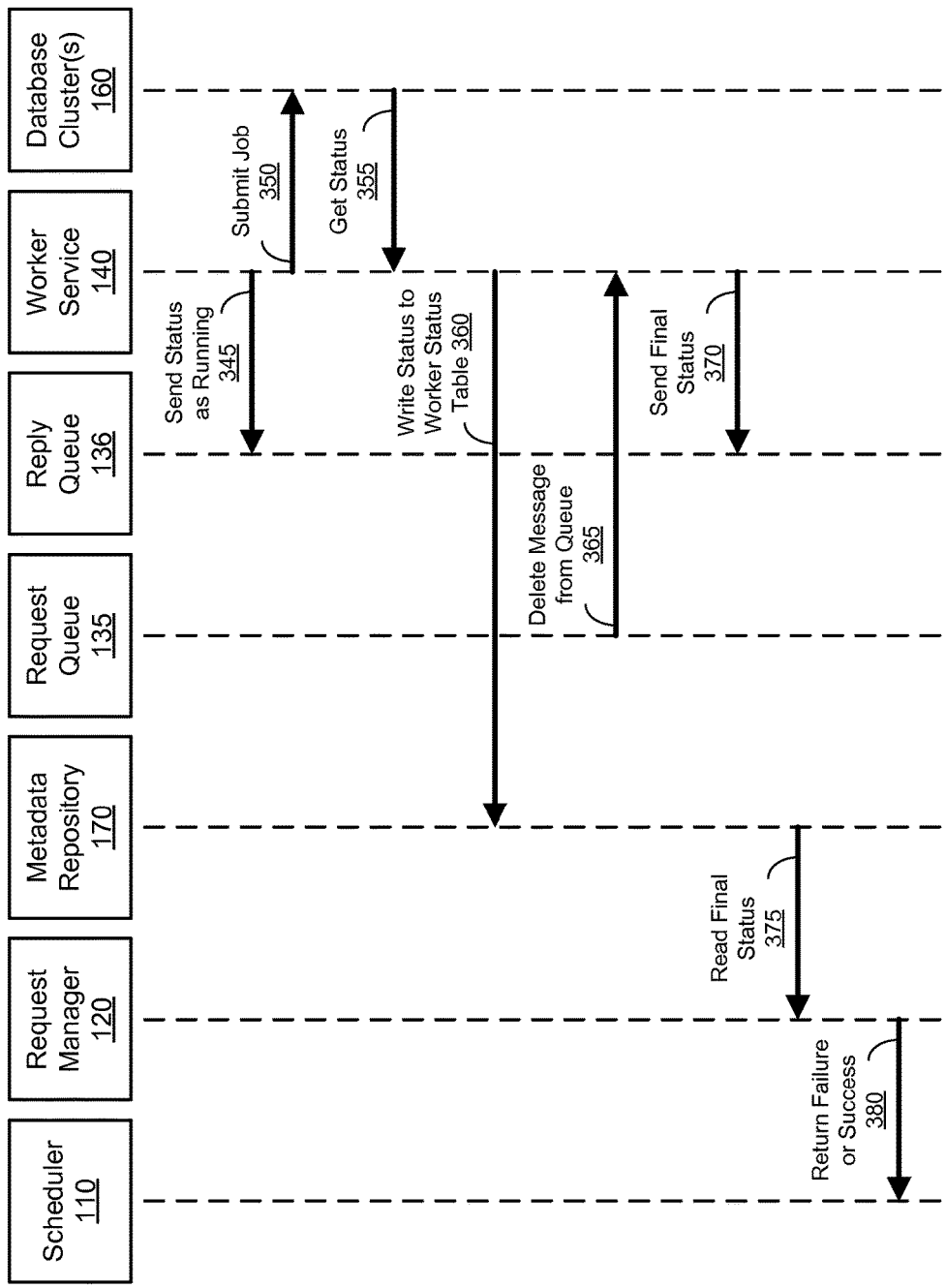

FIGS. 3A and 3B are process sequence diagrams for data warehouse management, according to some embodiments. The sequence diagrams shown in FIGS. 3A and 3B represent an example of the operations that may be performed by the data warehouse management system 100. As shown in 305, an agent associated with the request manager 120 may poll the job request scheduler 110 for job requests. If a job request is found, then as shown in 310, the job request scheduler 110 may start the process. As shown in 315, the request manager 120 may generate the job ID and job status and also record the job as "created" in the metadata repository 170. As shown in 320, the request manager 120 may enqueue the job in one of the request queues 135. As shown in 325, the request manager 120 may create a new status and then record the job as "enqueued" in the metadata repository 170. As shown in 330, the worker service 140 may read the request queue 135 and set the visibility timeout (e.g., 900 seconds). As will be discussed in greater detail below, the visibility timeout may function to keep the job from being picked up by another worker and incorrectly executed twice. As shown in 335, the worker service 140 may start a timer for the database cluster(s) 160. As shown in 340, the worker service may create a status and then record the job as "running" in the worker status table of the metadata repository 340.

As shown in 345, the worker service 140 may send the status as "running" to the reply queue 136. As shown in 350, the worker service 140 may submit the job to the appropriate database cluster 160. As shown in 355, the worker service 140 may get the status from the database cluster 160. The status may indicate that the job is currently executing or that the job has successfully or unsuccessfully completed. As shown in 360, the worker service 140 may write the status to the worker status table of the metadata repository 170. As shown in 365, the message may be deleted from the request queue 135. As shown in 370, the worker service 140 may send the final status to the reply queue 136. As shown in 375, the request manager 120 may read the final status from the metadata repository 170. As shown in 380, the request manager 120 may return the final status of failure or success to the job request scheduler 110.

Figure 4:
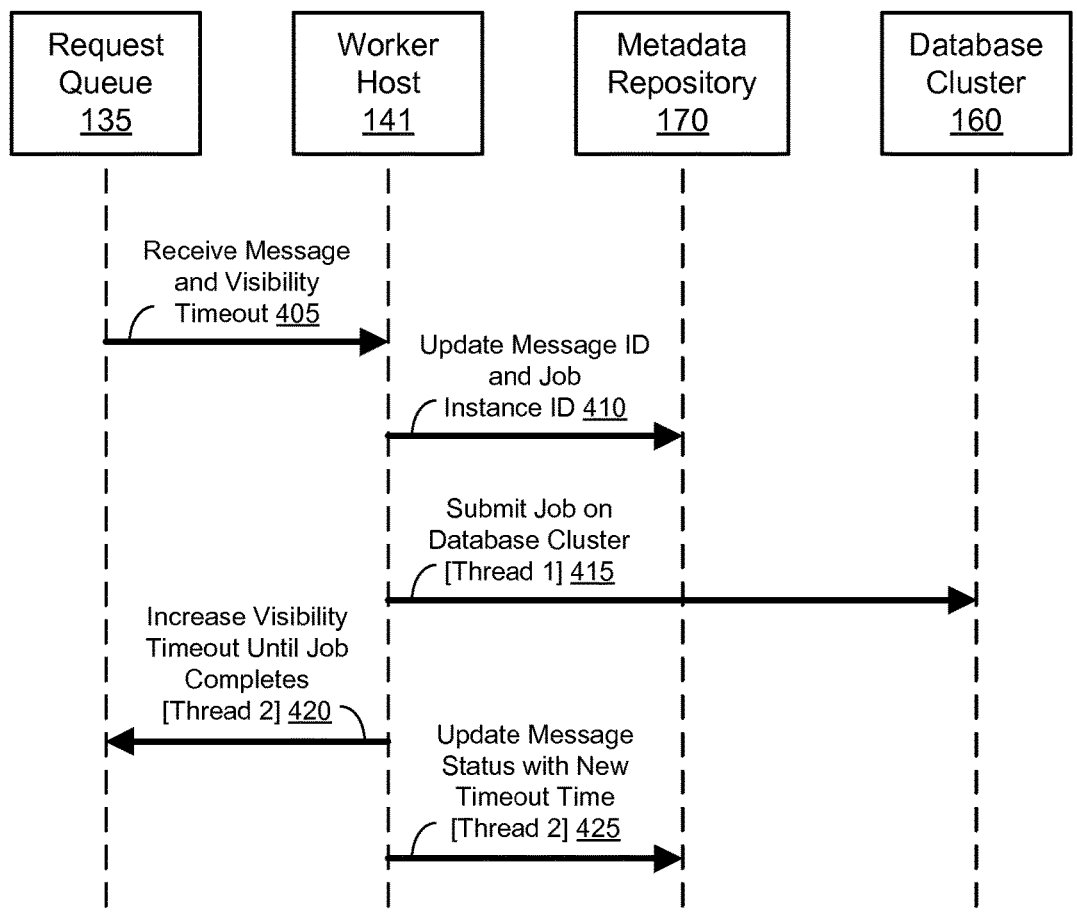
FIG. 4 is a worker program sequence diagram for data warehouse management, according to some embodiments.

FIG. 4 is a worker program sequence diagram for data warehouse management, according to some embodiments. The sequence diagram shown in FIG. 4 represents an example of the operations that may be performed by the worker component of the worker service 140. As shown in 405, a worker host 141 may receive a job message and visibility timeout from a request queue 135. As shown in 410, the worker host 141 may update the message ID and job instance ID in the metadata repository 170. The worker host may include at least a first thread and a second thread. As shown in 415, first thread of the worker host 141 may submit the job on a selected database cluster 160. As shown in 420, the second thread of the worker host 141 may repeatedly increase the visibility timeout until the job completes. As shown in 425, the second thread of the worker host 141 may update the message status with the new timeout time in the metadata repository 170.

Figure 5:
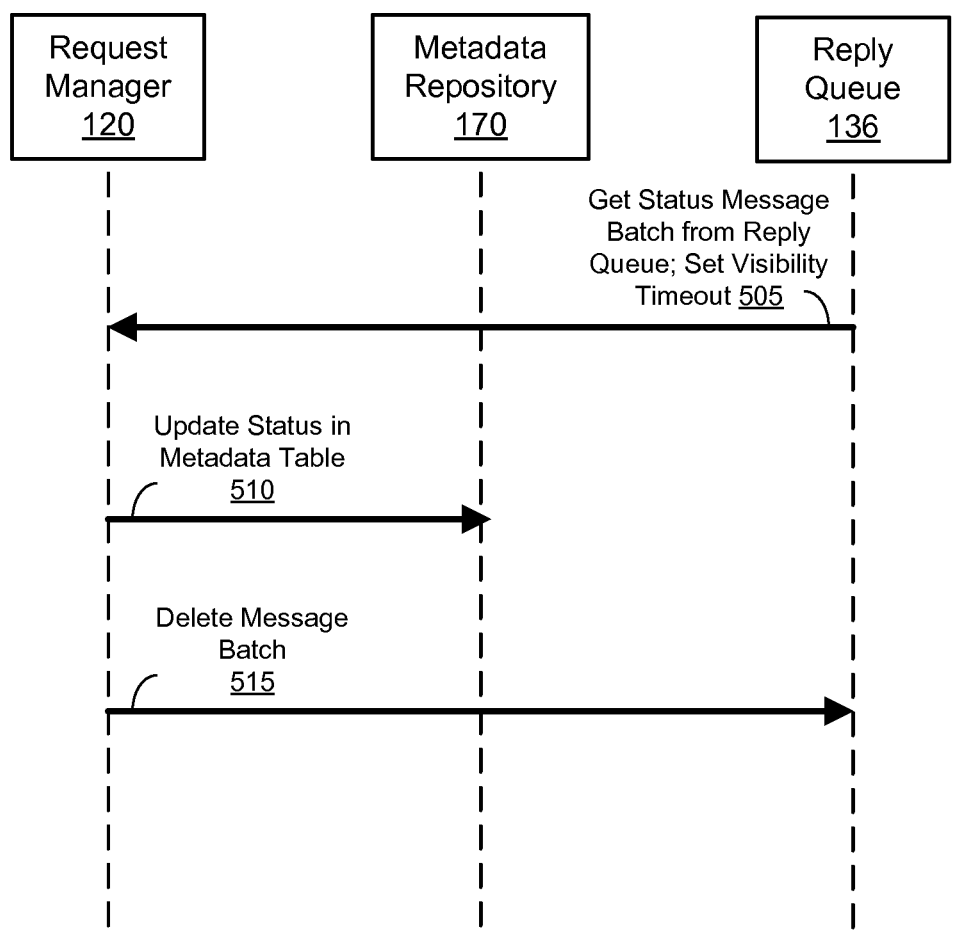
FIG. 5 is a request manager listener sequence diagram for data warehouse management, according to some embodiments.

FIG. 5 is a request manager listener sequence diagram for data warehouse management, according to some embodiments. The sequence diagram shown in FIG. 5 represents an example of the operations that may be performed by the a listener component of the request manager 120. As shown in 505, the request manager 120 may get a status message batch from the reply queue 136 and set the visibility timeout. As shown in 510, the request manager 120 may update the status in the appropriate metadata table of the metadata repository 170. As shown in 515, the request manager 120 may delete the message batch 515 from the reply queue 136.

Figure 6A:
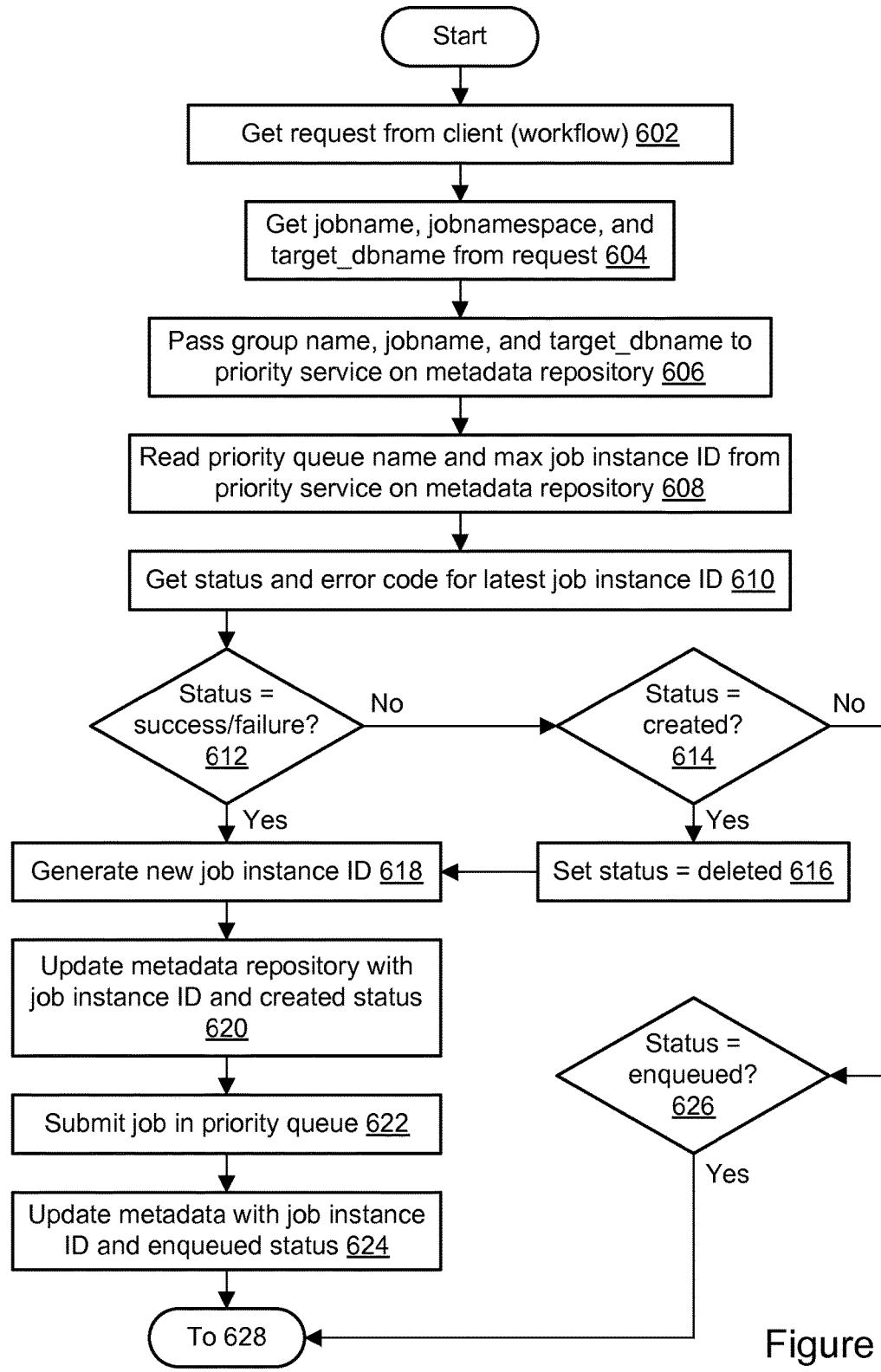
FIGS. 6A and 6B are flowcharts illustrating a method performed by a request manager for data warehouse management, according to some embodiments.
Figure 6B:
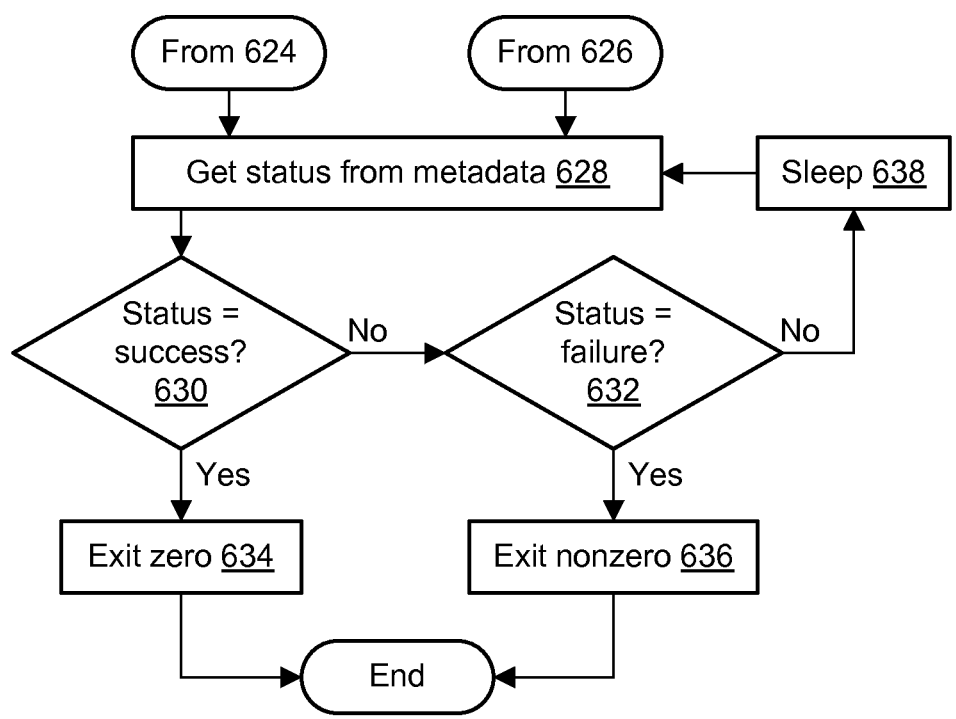

FIGS. 6A and 6B are flowcharts illustrating a method performed by a request manager for data warehouse management, according to some embodiments. As shown in 602, the request manager may get a job request from a client. The request may be retrieved from a job request scheduler. As shown in 604, the request manager may get the job name, job namespace, and target database name from the request. As shown in 606, the request manager may pass the group name (i.e., the name of the user group), the job name, and the target database name to the priority queue service. As shown in 608, the request manager may read the priority queue name and the max job instance ID from the priority service on the metadata repository. As shown in 610, the request manager may get the status and error code from the metadata repository for the latest job instance ID.

As shown in 612, the request manager may determine whether the status is success or failure. If the status is neither success nor failure, then as shown in 614, the request manager may determine whether the status has been created. If the status has not been created, then as shown in 626, the request manager may determine whether the status has been enqueued, and the processing may continue with the operation shown in 628. If the status has been created, then as shown in 616, the request manager may set the status as deleted. As shown in 618, the request manager may then generate a new job instance ID. As shown in 620, the request manager may update the metadata repository with the job instance ID and the created status. As shown in 622, the request manager may submit the job in the appropriate priority (request) queue. As shown in 624, the request manager may update the metadata with the job instance ID and the enqueued status.

As shown in 628, the request manager may get the status from the metadata in the metadata repository. As shown in 630, the request manager may determine whether the status indicates success. If so, then as shown in 634, the request manager may exit with a value of zero, and the process may end. If not, then as shown in 632, the request manager may determine whether the status indicates failure. If so, then as shown in 636, the request manager may exit with a nonzero value, and the process may end. If the status indicates neither success nor failure, then as shown in 638, the request manager may enter a sleep state until such time as it again gets the status from the metadata.

Figure 7A:
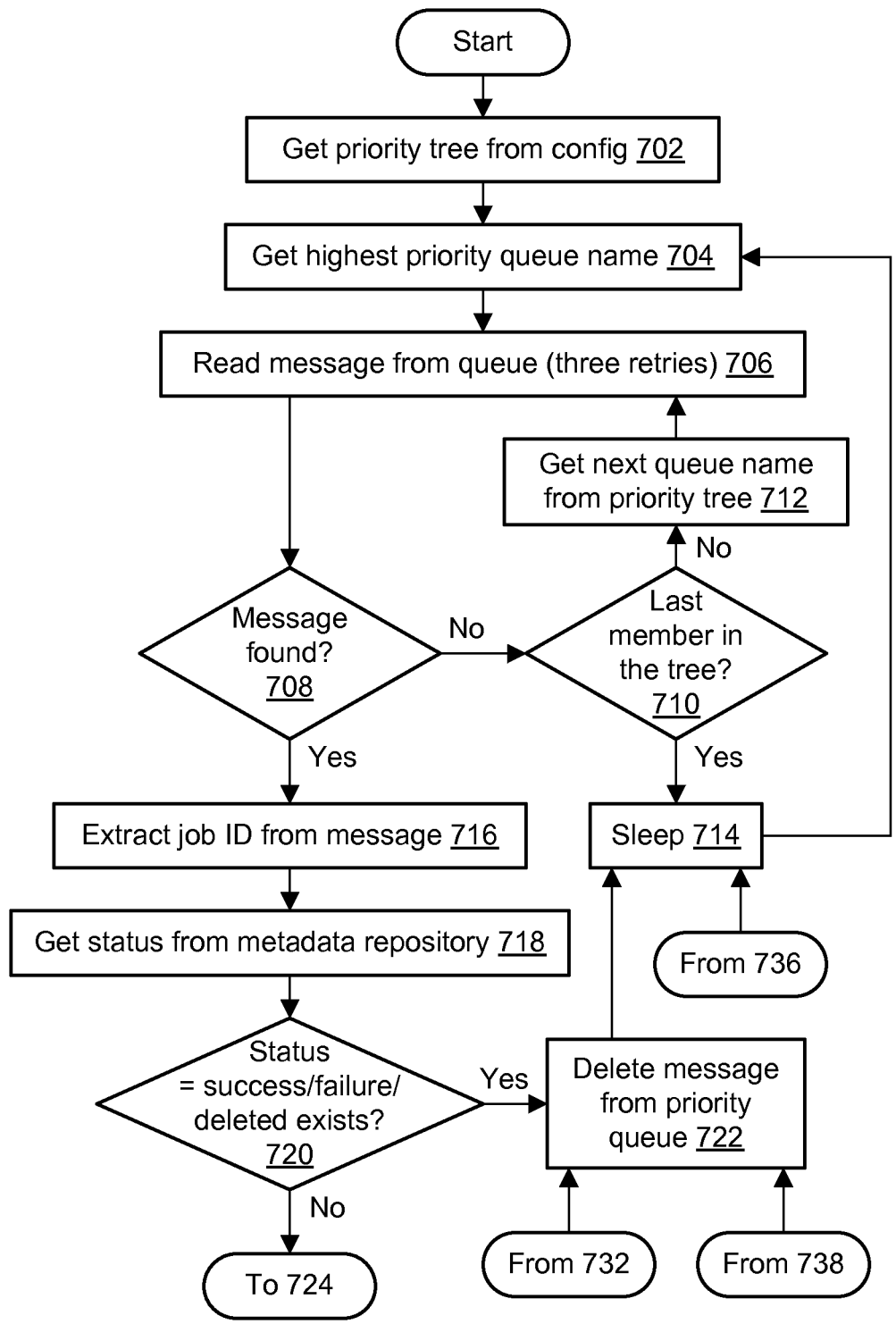
FIGS. 7A and 7B are flowcharts illustrating a method performed by a worker service for data warehouse management, according to some embodiments.
Figure 7B:
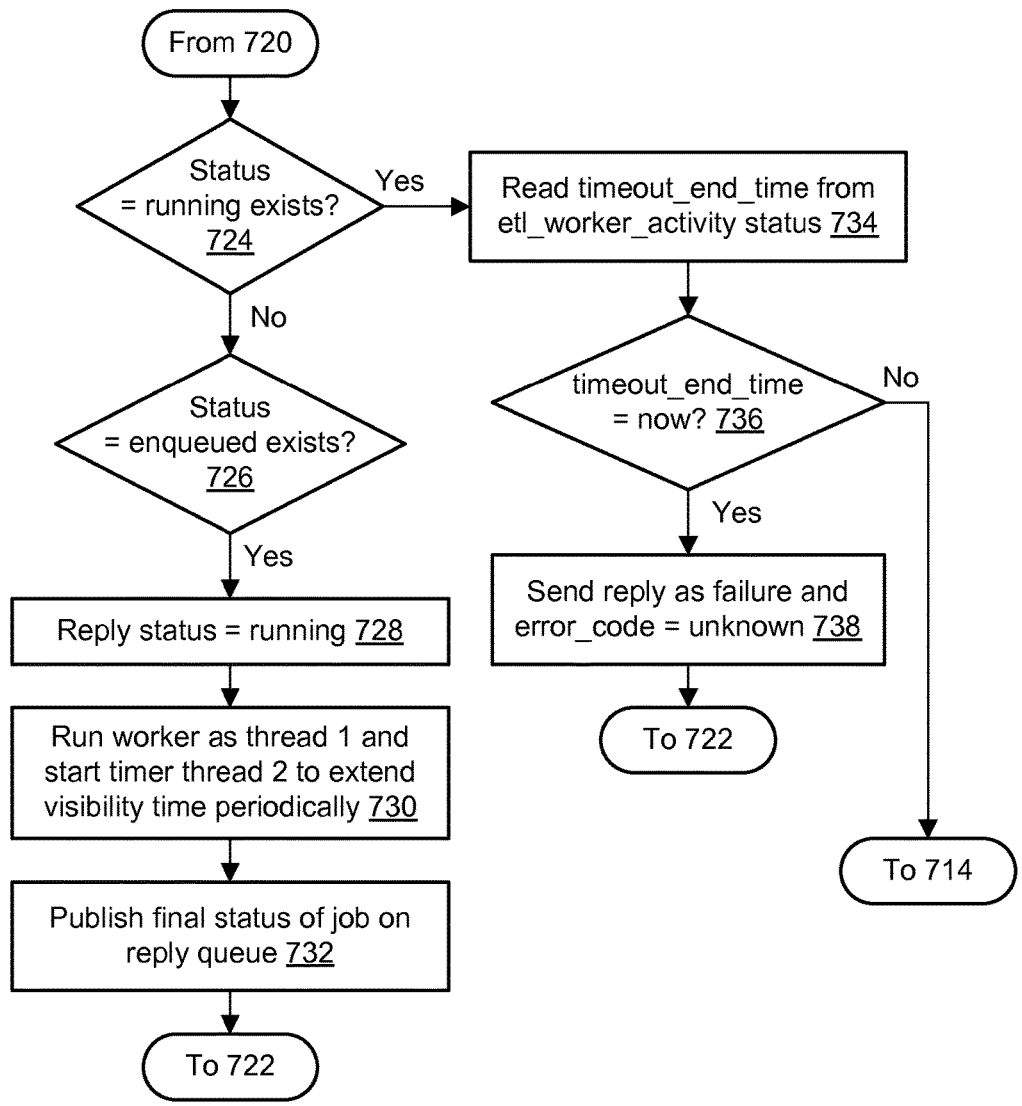

FIGS. 7A and 7B are flowcharts illustrating a method performed by a worker service for data warehouse management, according to some embodiments. As shown in 702, the worker service may get a priority tree from a configuration table of the metadata repository. As shown in 704, the worker service may get the highest priority queue name from the priority tree. As shown in 706, the worker service may read a message from the queue having the highest priority. In one embodiment, the operation shown in 706 may be attempted up to three times.

As shown in 708, the worker service may determine whether a message was found in the queue. If not, then as shown in 710, the worker service may determine whether the current queue is the last member in the priority tree. If not, then as shown in 712, the worker service may get the next highest queue name from the priority tree and again try to read a message from the corresponding queue. If the current queue is the last member in the priority tree, then as shown in 714, the worker service may enter a sleep state until such time as it again gets the highest priority queue name.

If a message was found in the queue, then as shown in 716, the worker service may extract a job ID from the message. As shown in 718, the worker service may get the status from the metadata repository. As shown in 720, the worker service may determine whether the status indicates success, failure, or deletion of the job. If so, then as shown in 722, the worker service may delete the message from the priority queue and then enter a sleep state. If not, then as shown in 724, the worker service may determine whether the status indicates that the job is running. If not, then as shown in 726, the worker service may determine whether the status indicates that the job has been enqueued. If so, then as shown in 728, the worker service may reply (e.g., to the reply queue) with a status of running. As shown in 730, the worker service may run the worker as a first thread and start a second thread as a timer thread. The timer thread may periodically extend the visibility time, e.g., by 900 seconds every 900 seconds or any other suitable value. As shown in 732, the worker service may publish the final status of the job on the reply queue. The processing may continue with the operation shown in 722.

If the status indicates that the job is running, then as shown in 734, the worker service may read the timeout_end_time from the etl_worker_activity_status table of the metadata repository. As shown in 736, the worker service may determine whether the timeout_end_time is now (e.g., whether the timeout has expired). If not, then the processing may enter the sleep state as shown in 714. If the job has timed out, then as shown in 738, the worker service may send a reply indicating failure and an error code indicating an unknown error. The processing may continue with the operation shown in 722.

FIG. 8 is a flowchart illustrating a method performed by a priority queue service for data warehouse management, according to some embodiments. As shown in 802, the priority queue service may read as input the user group name, the job namespace name, and the job name. As shown in 804, the priority queue service may get the target database and priority for the job. As shown in 806, the priority queue service may check access in the etl_database_access table of the metadata repository for the user group and the target database. As shown in 808, the priority queue service may determine whether access exists for the user group and the target database. If access does not exist, then as shown in 810, an error condition may be returned, and processing may end.

If access does exist, then as shown in 812, the priority queue service may determine whether the job priority is 1 (i.e., the highest priority). If not, then as shown in 814, the priority queue service may rank the unreserved queues based on their priorities. As shown in 816 and 818, the priority queue service may check if there is a queue having the same rank as the current priority number. If not, then as shown in 820, the priority queue service may return the queue with the least rank, and processing may end. If the queue does exist, then as shown in 822, the priority queue service may return the name of the queue to the request manager, and processing may end.

If the job priority is 1 (i.e., the highest priority), then as shown in 824 and 826, the priority queue service may check if there is a reserved queue for the same user group in the same database. If not, then as shown in 828, the priority queue service may return the name of the highest priority queue among the unreserved queues to the request manager. If the queue does exist, then as shown in 822, the priority queue service may return the name of the queue to the request manager, and processing may end.

Figure 9:
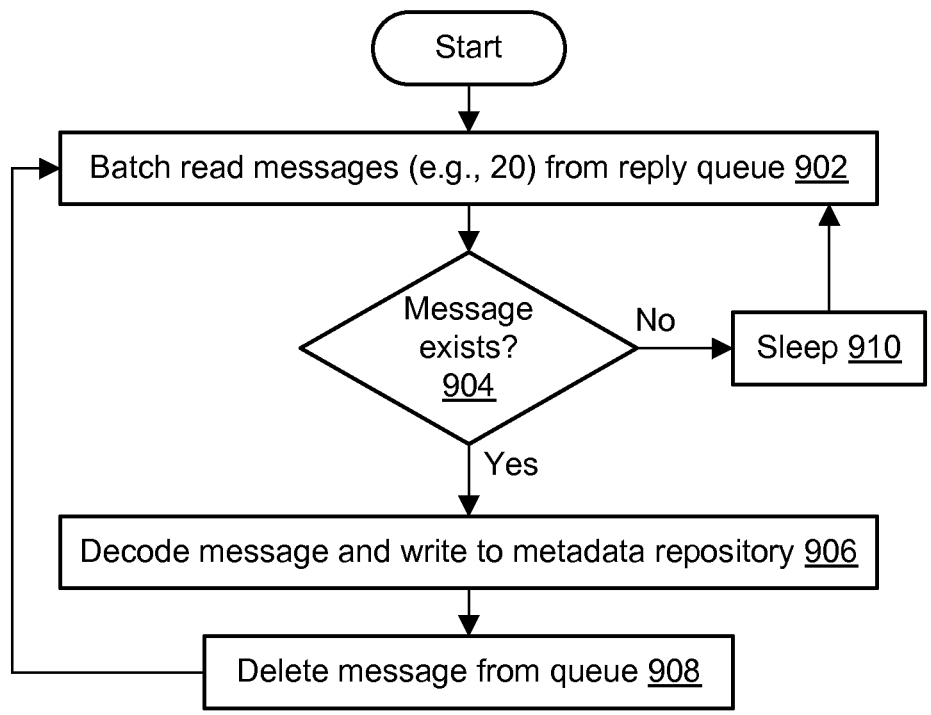
FIG. 9 is a flowchart illustrating a method performed by a request manager listener for data warehouse management, according to some embodiments.

FIG. 9 is a flowchart illustrating a method performed by a request manager listener for data warehouse management, according to some embodiments. As shown in 902, the listener may batch read messages (e.g., 20 messages or any suitable number) from the reply queue. As shown in 904, the listener may determine whether a message exists. If not, then as shown in 910, the listener may enter a sleep state until such time as it performs another batch read. If a message does exist, then as shown in 906, the listener may decode the message and write to the metadata repository. As shown in 908, the listener may then delete the message from the queue. Processing may continue with another batch read as shown in 902.

Illustrative Computer System

In at least some embodiments, a computer system that implements a portion or all of one or more of the technologies described herein may include a general-purpose computer system that includes or is configured to access one or more computer-readable media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1A, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms.

These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a data warehouse management system, wherein the data warehouse management system comprises:
a job request scheduler configured to generate a workflow for a plurality of data warehouse operations, wherein the job request scheduler is further configured to:
determine dependencies between jobs for job requests corresponding to the plurality of data warehouse operations, and
schedule job requests for the workflow according to the dependencies such that a dependent job is scheduled to execute after another job on which it is dependent;
a request manager configured to:
retrieve the scheduled job requests for the plurality of data warehouse operations from the job request scheduler,
determine priorities for the retrieved job requests, and
select, for each job request of the retrieved job requests, a respective priority queue from among a plurality of priority queues, wherein at least two priority queues of the plurality of priority queues represent different priority levels, and wherein the selection of the respective priority queue is based at least in part on the determined priorities and the different priority levels;
the priority queue service configured to:
provide the plurality of priority queues, and
place each job request from the request manager into the selected respective priority queue of the plurality of priority queues;
a worker service configured to:
retrieve the job requests for the plurality of data warehouse operations from the plurality of priority queues according to the different priority levels,
select, for each job request, a respective database cluster from among a plurality of database clusters in a data warehouse service, wherein the respective database cluster is selected based at least in part on performance data of the plurality of database clusters, and
cause execution of individual ones of the plurality of data warehouse operations for each of the job request on the selected respective database cluster of the plurality of database clusters; and
the data warehouse service comprising the plurality of database clusters, wherein the plurality of database clusters are configured to store data from the execution of the plurality of data warehouse operations.

2. The system as recited in claim 1, wherein the data warehouse management system further comprises:
a metadata repository configured to store metadata relating to the plurality of data warehouse operations.

3. The system as recited in claim 1, wherein the worker service is configured to retrieve the job requests for the plurality of data warehouse operations from the plurality of priority queues in the priority order from highest priority to lowest priority.

4. The system as recited in claim 1, wherein the job request scheduler is further configured to receive one or more results of the plurality of data warehouse operations, and wherein the job request scheduler is configured to schedule one or more additional data warehouse operations in response to the one or more results.

5. A computer-implemented method, comprising:
generating a workflow representing requests for data warehouse operations and determining dependencies between the requests, wherein the data warehouse operations include a first data warehouse operation and a second data warehouse operation;
schedule the requests according to the dependencies such that a dependent request is scheduled to execute after another request on which it is dependent;
determining a respective priority of each of the scheduled requests for data warehouse operations in the workflow;
enqueueing each of the scheduled requests for data warehouse operations in a respective request queue of a plurality of request queues according to the respective priority, wherein the plurality of request queues represent different priority levels and comprise a higher priority request queue and a lower priority request queue, wherein the request for the first data warehouse operation is enqueued in the higher priority request queue, wherein the request for the second data warehouse operation is enqueued in the lower priority request queue, wherein the request for the first data warehouse operation and the request for the second data warehouse operation are enqueued according to the respective priorities previously determined and the different priority levels;
retrieving the requests from the plurality of request queues according to the respective priorities;
select, for each request, a respective database cluster from among a plurality of database clusters based at least in part on their respective performance data; and
cause execution of individual ones of the plurality of data warehouse operations for each of the requests on the respective database cluster.

6. The method as recited in claim 5, wherein the retrieving and executing comprise:
retrieving the request for the first data warehouse operation from the higher priority request queue;
after retrieving the request for the first data warehouse operation from the higher priority request queue, executing the first data warehouse operation; and
after retrieving the request for the first data warehouse operation from the higher priority request queue, determining that the higher priority request queue is empty;

after determining that the higher priority request queue is empty, retrieving the request for the second data warehouse operation from the lower priority request queue; and after retrieving the request for the second data warehouse operation from the lower priority request queue, executing the second data warehouse operation.

7. The method as recited in claim 6, wherein the first data warehouse operation is executed using a data warehouse accessible to a client over a network, and wherein the second data warehouse operation is executed using a data warehouse hosted by the client.

8. The method as recited in claim 6, wherein the request for the first data warehouse operation is assigned to a worker host accessible to a client over a network, and wherein the request for the second data warehouse operation is assigned to a worker host hosted by the client.

9. The method as recited in claim 5, further comprising:
receiving a result of the first data warehouse operation; and scheduling a request for a third data warehouse operation in response to receiving the result of the first data warehouse operation, wherein the third data warehouse operation is dependent on completion of the first data warehouse operation.

10. The method as recited in claim 5, wherein the first data warehouse operation comprises an extraction of data from a data source, a transformation of the extracted data, and a loading of the transformed data into a data warehouse.

11. A non-transitory, computer-readable storage medium storing program instructions computer-executable to implement a workflow service that provides a service interface for a plurality of clients, wherein the workflow service is configured to perform:

receiving, via the service interface, a request for a data warehouse operation;

receiving, via the service interface, an identification of a data source for the data warehouse operation;

receiving, via the service interface, an identification of a worker included within a worker fleet that includes different types of workers for different types of data warehouses, wherein the worker is configured to perform the data warehouse operation;

receiving, via the service interface, an identification of a target data warehouse for the data warehouse operation; and configuring a plurality of services for queuing and execution of the data warehouse operation based at least in part on the request for the data warehouse operation, the identification of the data source, the identification of the worker, and the identification of the target data warehouse, comprising:

generating a plurality of queues, wherein each of the plurality of queues corresponds to a respective priority level;

selecting one of the plurality of queues based at least in part on a priority of the request for the data warehouse operation and the respective priority levels of the plurality of queues; and configuring the worker to select one of a plurality of database clusters in the target data warehouse to execute the data warehouse operation, wherein the selection is made based at least in part on respective performance data of the database clusters and execute the data warehouse operation on the selected database cluster.

12. The non-transitory, computer-readable storage medium as recited in claim 11, wherein the request for the data warehouse operation, the identification of the data source, the identification of the worker, and the identification of the target data warehouse are received through a user interface.

13. The non-transitory, computer-readable storage medium as recited in claim 11, wherein, in configuring the plurality of services, the program instructions are computer-executable to perform:

configuring a job request scheduler to store a workflow representing the data warehouse operation;

causing a request manager to poll the scheduler for the data warehouse operation; and causing the request manager to place the request for the data warehouse operation in the selected queue based on the priority of the request.

14. The non-transitory, computer-readable storage medium as recited in claim 13, wherein the program instructions are further computer-executable to perform:

receiving a result of the data warehouse operation, wherein the data warehouse operation comprises a modification of data hosted in a first geographical location; and enqueuing a request for an additional data warehouse operation in response to receiving the result of the data warehouse operation, wherein the additional data warehouse operation is dependent on completion of the data warehouse operation, and wherein the additional data warehouse operation comprises a modification of data hosted in a second geographical location.

15. The non-transitory, computer-readable storage medium as recited in claim 11, wherein the data warehouse operation comprises an extraction of data from the data source, a transformation of the extracted data, and a loading of the transformed data into the target data warehouse.

16. A system, comprising:
at least one processor; and
a memory coupled to the at least one processor, wherein the memory stores program instructions, wherein the program instructions are executable by the at least one processor to:

determine dependencies between requests for data warehouse operations, wherein the data warehouse operations include a first data warehouse operation and a second data warehouse operation;

schedule the requests according to the dependencies such that a dependent request is scheduled to execute after another request on which it is dependent determine a respective priority of each of the scheduled requests for data warehouse operations;

enqueue each of the scheduled requests for data warehouse operations in a respective request queue of a plurality of request queues, wherein the plurality of request queues represent different priority levels and comprise a higher priority request queue and a lower priority request queue, wherein the request for the first data warehouse operation is enqueued in the higher priority request queue, wherein the request for the second data warehouse operation is enqueued in the lower priority request queue, wherein the request for the first data warehouse operation and the request for the second data warehouse operation are enqueued according to the respective priorities previously determined and the different priority levels; and retrieve the requests from the plurality of request queues according to the respective priorities;

select for each request a respective database cluster from among a plurality of database clusters based at least in part on their respective performance data; and cause execution of individual ones of the plurality of data warehouse operations for each of the requests on the respective database cluster.

17. The system as recited in claim 16, wherein to retrieve and execute the first and second data warehouse operations, the program instructions are executable by the at least one processor to:

retrieve the request for the first data warehouse operation from the higher priority request queue;

after retrieving the request for the first data warehouse operation from the higher priority request queue, cause execution of the first data warehouse operation; and after retrieving the request for the first data warehouse operation from the higher priority request queue, determine that the higher priority request queue is empty;

after determining that the higher priority request queue is empty, retrieve the request for the second data warehouse operation from the lower priority request queue;

after retrieving the request for the second data warehouse operation from the lower priority request queue, cause execution of the second data warehouse operation.

18. The system as recited in claim 16, wherein the program instructions are executable by the at least one processor to:

receive a result of the first data warehouse operation, wherein the first data warehouse operation comprises a modification of data hosted in a first geographical location; and schedule a request for a third data warehouse operation in response to receiving the result of the first data warehouse operation, wherein the third data warehouse operation is dependent on completion of the first data warehouse operation, and wherein the third data warehouse operation comprises a modification of data hosted in a second geographical location.

19. The system as recited in claim 16, wherein the first data warehouse operation is executed using a data warehouse accessible to a client over a network, and wherein the second data warehouse operation is executed using a data warehouse hosted by the client.

20. The system as recited in claim 16, wherein the first data warehouse operation comprises an extraction of data from a data source, a transformation of the extracted data, and a loading of the transformed data into a data warehouse.

* * * * *